United States Patent Office.

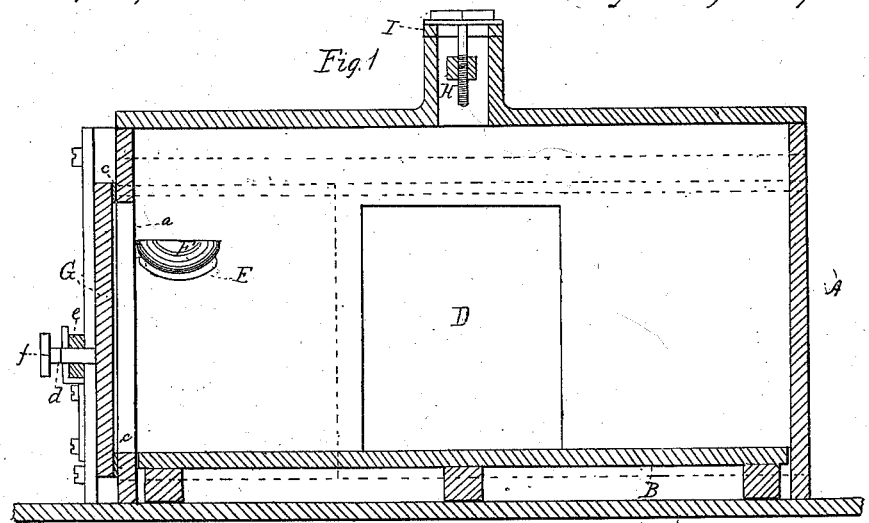
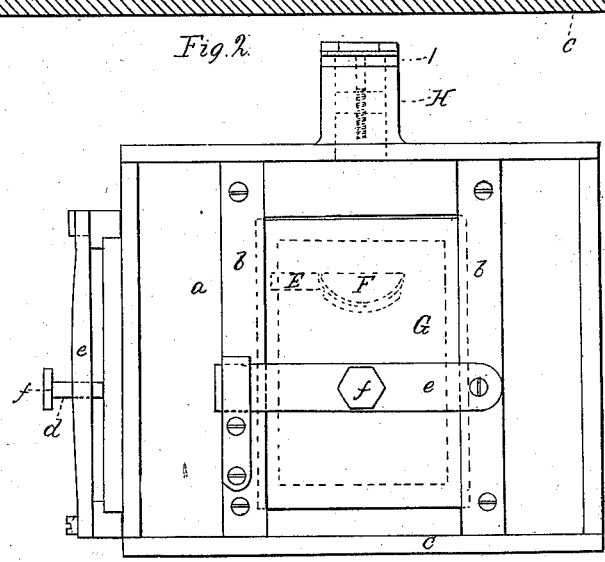
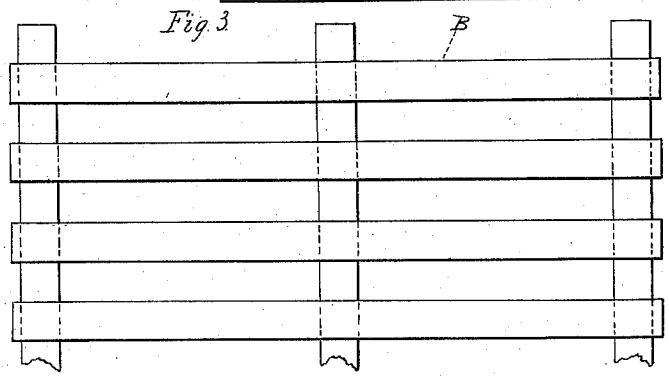

E. R. NORNY, OF McDONOUGH, DELAWARE, ASSIGNOR TO HIMSELF AND AMOS CARLISLE, OF PHILADELPHIA, PENNSYLVANIA.

Letters Patent No. 94,908, dated September 14, 1869.

IMPROVEMENT IN PRESERVING ANIMAL AND VEGETABLE SUBSTANCES IN TRANSIT.

The Schedule referred to in these Letters Patent and making part of the same.

*To all whom it may concern:*

Be it known that I, E. R. NORNY, of McDonough, in the county of New Castle, and State of Delaware, have invented a new and improved Mode of Preserving Animal and Vegetable Substances in Transit; and I do hereby declare that the following is a full and exact description thereof, reference being had to the accompanying drawings, and to the letters of reference marked thereon.

The nature of my invention or discovery consists in the preservation of animal and vegetable substances in transit, in air-tight, or partially air-tight cars, or rooms in floating-vessels, by fumigating them with sulphurous-acid gas, or other antiseptic gas, the said cars, or other compartments, being so constructed as to provide for the renewal of the fumigation, whenever the substances require it, without their removal from the cars or other compartments.

In the accomplishment of this object, I first impregnate the substances with the gas, by placing them in air-tight rooms or vessels and filling the latter with the gas. I then remove them to air-tight compartments of cars or floating vessels, for transportation; or else I omit subjecting said substances to the action of the gas, until they are placed in the transit-compartments.

The invention further consists in the combination and arrangement of valves with said air-tight compartments, for the discharge of gas, when a superabundance has been accumulated, so as to prevent the surcharge of the contents of the room, or the escape of the gas into an adjoining room.

The use of the valve is also necessary when the preserving-room has to be opened for the removal of any or all of the freight, it being necessary at such time to discharge the most, if not all of the gas before opening the door of the room or car. These rooms need only be comparatively air-tight.

The chief object of the invention is the transportation of fresh meats, delicate vegetables and fruits, that would be injured in their transit when otherwise conveyed a long distance. By the use of this invention, it becomes practicable to convey such articles in a pure and fresh state to distant parts of the country, so as to supply the market in cities and large towns, or to other countries, to supply the foreign market. The supply may, in the same manner, be made to armies and naval and other vessels at sea.

I am thus enabled to dispense with the practice of driving animals a long distance to be slaughtered, whereby they become partially starved; or I supersede the necessity of transporting them in pent-up cars, which causes them much suffering, and is highly injurious to the wholesomeness and quality of their meat.

To enable others skilled in the arts to apply my invention to practice, I will now describe the mode by which I carry it into effect.

In the accompanying drawings, which make a part of this specification—

Figure 1 is a vertical longitudinal section of the body of a car, with the improvements in connection therewith.

Figure 2 is an end elevation of the same.

Figure 3 is a top view of the bottom B.

Like letters, in all the figures, indicate the same parts.

A is an air-tight body of a car.

B is a slat-bottom of the same, the slats being raised a short distance above the main bottom C, to provide for a free circulation of the gas, hereinafter mentioned, beneath and around the meats or other things placed upon said bottom B.

In some cases, a plurality of the bottoms or slatted frames B, arranged one above another, at suitable distances apart, to receive the freight, may be found necessary to promote the free circulation of the gas through the freight.

D is a sliding door of the body A, which is the entrance to the interior of the car.

E is a bracket, which projects from the end *a* of the car, for the support of the vessel F, in which sulphur is placed to be burnt, to form sulphurous-acid gas, to fill the compartment A, for the preservation of its contents.

G is a sliding gate, which has a vertical movement in the ways *b b*, for opening the communication with the compartment A, when the sulphur contained in the vessel F is to be burnt, and for closing the same when the burning is completed. When the gate is closed, it is held firmly against the face of the opening G', to make the same air-tight, there being gum strips, *c*, interposed between the gate and the face of said opening, and the gate being fastened by means of the screw *d* and clamp *e*.

The door D is made air-tight, and held in the same manner.

The screws have large heads *f*, upon which a wrench is placed to manipulate the same.

H is a vertical tube in the top of the body A, which is provided with a valve, I, for opening and closing the communication with the upper part of the body A.

I have represented in the drawings a flat valve, confined by means of a screw with a large head, so that it cannot be opened, except by means of a wrench made expressly for the purpose, to prevent its being tampered with by evil-disposed persons. The confining-heads of the door D and gate G have similar heads, for the same purpose. The valve I, however, being comparatively out of reach of such persons, may, under ordinary circumstances, not require such protection. In such case, it may be constructed in any ordinary manner, by which a draught and ventilation may be effected without departing from the principles of this invention. Sometimes it may be better to have two or more valves, instead of one.

When the sulphur contained in the vessel F is to be burnt, the valve I and gate G are opened far enough to create sufficient draught, and a match is applied to the sulphur. To make it convenient to apply a match, the gate may be raised until its lower edge comes above the height of the vessel F. When the sulphur is ignited, the gate is lowered, so as to leave an opening beneath its lower edge only large enough to create a draught. When the burning of the sulphur is completed, the gate is moved clear down, and secured by means of the screw-bolt $d$ and swivel-clamp $e$. When it becomes necessary to replenish the gas, in consequence of leakage, or otherwise, the same process is repeated.

When the compartment A has to be opened, the valve I is also opened, to provide for the discharge of the gas before the door D is opened. It is also partially opened for the discharge of any overcharge of gas which may occur at any time.

I line the compartment A with sheet-metal, or else varnish it, or otherwise coat it, to make it air-tight.

It is necessary for long distances, and especially in hot weather, to sprinkle the contents of the preserving-room with water, or other liquid compound for which sulphurous-acid gas has an affinity, and then recharge it with gas.

It will readily be seen that the description of the application of the invention above given is also applicable to floating vessels, and other air-tight compartments or rooms.

I do not confine myself to the particular construction of the compartment A, as above described, as various modifications may be made by which the invention may be efficiently carried into effect. Neither do I confine myself to generating the sulphurous-acid gas inside of the compartment A, as it may advantageously be generated outside, and conveyed into the said compartment by means of a pipe or hose, in which case one generating-device may answer for a number of cars or rooms, the main pipe for conveying the gas having branch pipes, in connection, leading thereto. Besides, slaughtered animals, or fruits and vegetables, may be dampened, and subjected to the action of the sulphurous-acid gas, or other antiseptic agent, in the same manner, in local rooms, before being placed in the cars or vessels for transportation, without any further treatment of the gas, if the distance is not too long, or the weather too hot; or they may be covered, or not, with dampened cloths, to prevent discoloration or evaporation, and carried in non-air-tight cars or other vessels, or receptacles that may hold the same, without any process of heat.

I do not claim, broadly, the preservation of animal and vegetable substances by the use of sulphurous-acid, or other antiseptic gas, in closed compartments, as that is not new.

What I claim as my invention, and desire to secure by Letters Patent, is—

1. The combination and arrangement of the valve I with the compartment A, substantially as and for the purpose set forth.

2. The arrangement of the vessel F, bracket E, elevated open bottom B, gate G, and valve I, in relation to each other, and the compartment A, substantially as and for the purpose specified.

In testimony that the above is my invention, I have hereunto set my hand and affixed my seal, this 6th day of July, 1869.

E. R. NORNY. [L. S.]

Witnesses:
STEPHEN USTICK,
WM. LARZELERE.